(12) United States Patent
Ikeda et al.

(10) Patent No.: US 9,034,065 B2
(45) Date of Patent: May 19, 2015

(54) EXHAUST GAS PURIFICATION SYSTEM

(75) Inventors: Takashi Ikeda, Fujisawa (JP); Tetsuya Asami, Fujisawa (JP); Hitoshi Satou, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 115 days.

(21) Appl. No.: 13/703,262

(22) PCT Filed: Jun. 10, 2011

(86) PCT No.: PCT/JP2011/063324
§ 371 (c)(1),
(2), (4) Date: Dec. 10, 2012

(87) PCT Pub. No.: WO2011/155589
PCT Pub. Date: Dec. 15, 2011

(65) Prior Publication Data
US 2013/0081367 A1    Apr. 4, 2013

(30) Foreign Application Priority Data
Jun. 11, 2010   (JP) .................................. 2010-134515

(51) Int. Cl.
*B01D 50/00* (2006.01)
*B01D 39/00* (2006.01)
(Continued)

(52) U.S. Cl.
CPC .......... *B01D 46/0063* (2013.01); *F01N 3/0235* (2013.01); *F01N 3/0253* (2013.01);
(Continued)

(58) Field of Classification Search
CPC ......... F01N 3/027; F01N 3/035; F01N 41/40; F01N 3/023; F01N 3/025; F02D 41/029; Y02T 10/47; B01D 46/0063; B01D 2279/30
See application file for complete search history.

(56) References Cited

U.S. PATENT DOCUMENTS

2006/0260299 A1* 11/2006 Wang et al. ..................... 60/297
2008/0000219 A1* 1/2008 Ratcliff et al. .................. 60/274
(Continued)

FOREIGN PATENT DOCUMENTS

JP   2000-303826   10/2000
JP   2004-197697    7/2004
(Continued)

OTHER PUBLICATIONS

International Search Report of Corresponding PCT Application PCT/JP2011/063324 mailed Sep. 13, 2011.
(Continued)

*Primary Examiner* — Amber Orlando
(74) *Attorney, Agent, or Firm* — Staas & Halsey LLP

(57) ABSTRACT

A diesel particulate defuser (DPD) for collecting particulate matter (PM) in exhaust gas is connected to an exhaust pipe of a diesel engine, and when the amount of PM in the DPD becomes equal to or greater than a predetermined amount, the exhaust gas temperature of the diesel engine is increased by performing exhaust pipe injection and DPD is automatically regenerated. In such an exhaust gas purification system, an exhaust gas temperature during DPD regeneration in automatic regeneration is detected, a difference between the detected exhaust gas temperature and a target regeneration temperature is determined, and in a case where an exhaust pipe injection amount is PID controlled based on the difference, when a transition is made from the traveling automatic regeneration to the idle automatic regeneration conducted during a stop, an integral control term in the PID control is reset to zero to control the exhaust pipe injection amount.

7 Claims, 2 Drawing Sheets

(51) Int. Cl.

| | | |
|---|---|---|
| *B01D 41/00* | (2006.01) | |
| *B01D 45/00* | (2006.01) | |
| *B01D 46/00* | (2006.01) | |
| *B01D 51/00* | (2006.01) | |
| *B01D 49/00* | (2006.01) | |
| *F01N 3/023* | (2006.01) | |
| *F01N 3/025* | (2006.01) | |
| *F01N 3/035* | (2006.01) | |
| *F01N 3/10* | (2006.01) | |
| *F01N 9/00* | (2006.01) | |
| *F02D 41/08* | (2006.01) | |
| *F01N 13/00* | (2010.01) | |
| *F02D 41/02* | (2006.01) | |
| *F02D 41/14* | (2006.01) | |

(52) U.S. Cl.
CPC ............... *F01N 3/035* (2013.01); *F01N 3/106* (2013.01); *F01N 9/002* (2013.01); *F02D 41/025* (2013.01); *F02D 41/029* (2013.01); *F02D 41/08* (2013.01); *F02D 41/1446* (2013.01); *F02D 41/1482* (2013.01); *F02D 2041/1409* (2013.01); *Y02T 10/47* (2013.01); *F01N 2240/36* (2013.01); *F01N 2610/146* (2013.01); *F01N 2900/10* (2013.01); *F01N 2900/1404* (2013.01); *F01N 13/0097* (2014.06)

(56) References Cited

U.S. PATENT DOCUMENTS

| | | | | |
|---|---|---|---|---|
| 2008/0295485 | A1* | 12/2008 | Wiley et al. | 60/274 |
| 2009/0025372 | A1* | 1/2009 | Onodera et al. | 60/286 |
| 2009/0056316 | A1* | 3/2009 | Haseyama et al. | 60/286 |
| 2009/0082938 | A1* | 3/2009 | Onodera et al. | 701/103 |
| 2009/0145115 | A1* | 6/2009 | Torisaka | 60/286 |

FOREIGN PATENT DOCUMENTS

| | | |
|---|---|---|
| JP | 2005-282545 | 10/2005 |
| JP | 4175281 | 10/2005 |
| JP | 2008-542950 | 11/2008 |
| JP | 2009-174513 | 8/2009 |
| WO | WO 2006/132943 A2 | 12/2006 |

OTHER PUBLICATIONS

Patent Abstracts of Japan, Publication No. 2009-174513, Published Aug. 6, 2009.
Patent Abstracts of Japan, Publication No. 2005-282545, Published Oct. 13, 2005.
Patent Abstracts of Japan, Publication No. 2000-303826, Published Oct. 31, 2000.
Patent Abstracts of Japan, Publication No. 2004-197697, Published Jul. 15, 2004.
Written Opinion of the International Searching Authority mailed Sep. 13, 2011 in corresponding International Application No. PCT/JP2011/063324.

* cited by examiner

EXHAUST GAS PURIFICATION SYSTEM

CROSS-REFERENCE TO RELATED APPLICATIONS

This application claims the benefit of Japanese Patent Application No. 2010-134515, filed on Jun. 11, 2010, the contents of which is incorporated herein by reference, which serves as priority for PCT Application No. PCT/JP2011/063324, filed Jun. 10, 2011.

The present invention relates to an exhaust gas purification system that collects PM (Particulate Matter) contained in exhaust gas from a diesel engine and also decreases $NO_x$ and discharges the purified exhaust gas, and more particularly to a system for exhaust gas purification when a vehicle is temporarily stopped during automatic regeneration of a diesel particulate defuser (DPD) and idle automatic regeneration is performed.

BACKGROUND ART

An exhaust gas purification system in which a DPD and a SCR (Selective Catalytic Reduction) device are connected to an exhaust pipe has been developed for purifying and discharging exhaust gas from diesel engines.

In such an exhaust gas purification system, PM contained in the exhaust gas is collected by the DPD. Further, in the SCR system provided with a SCR device in such exhaust gas purification system, urea water stored in an urea tank is supplied to the exhaust gas upstream of the SCR, ammonia is generated by the heat of the exhaust gas, and $NO_x$ is reduced and decreased on the SCR catalyst by the ammonia (see, for example, Patent Documents 1 and 2).

Since the PM collected by the DPD causes clogging of the filter, regeneration should be performed by oxidizing, as appropriate, and removing the collected and deposited PM.

In the case where the detection of clogging is performed automatically by an ECU (Engine Control Unit) or manually when the difference between the pressure detected by exhaust gas pressure sensors before and after the DPD reaches an upper limit value, a DPD alarm lamp provided inside a cabin is lit up and the driver starts the DPD regeneration by pushing a regeneration execution switch.

The DPD is constituted by a DOC (Diesel Oxidation Catalyst) constituted by an active catalyst that oxidizes the unburned fuel and a CSF (Catalyzed Soot Filter) that collects the PM contained in the exhaust gas.

The DPD is regenerated by performing multi-injection (pilot injection, pre-injection, main injection, after-injection) of fuel to raise the exhaust gas temperature to a temperature equal to or higher than the catalyst activation temperature of the DOC, then adding post-injection, raising the exhaust gas temperature to 500° C. and then to about 600° C., and removing the PM collected on the CSF by burning with such high-temperature exhaust gas. However, where post-injection is performed, fuel oil mixes with the lubricating oil of cylinders, thereby diluting the lubricating oil. Therefore, the DPD regeneration is performed by the so-called exhaust pipe injection in which fuel (HC) is injected in the exhaust pipe upstream of the DPD.

In the exhaust pipe injection, the DPD regeneration is performed in an automatic mode as the vehicle travels and in a manual mode by idle rotation after the vehicle has been stopped, in the same manner as in the post-injection. Usually the automatic regeneration is performed as the vehicle travels, but because the vehicle travels during the regeneration, the exhaust gas temperature is unstable and PM burning residue easily appears inside the DPD when the vehicle repeatedly is accelerated and decelerated. Accordingly, when the regeneration interval is short and the automatic regeneration of the DPD is performed repeatedly, the driver is encouraged to perform manual regeneration, and the driver removes the PM present in the DPD by manual regeneration by pushing the manual regeneration execution switch after the vehicle is stopped.

Further, when the vehicle is stopped during traveling automatic regeneration, the regeneration is continued by closing an exhaust gas brake valve to prevent the exhaust gas temperature from decreasing, so as to enable the regeneration also by idle rotation.

In such automatic regeneration, the temperature of the exhaust gas flowing into the CSF is detected with an exhaust gas temperature sensor provided downstream of the DOC, a difference between this exhaust gas temperature and a target regeneration temperature (for example, 500° C. and 600° C.) is determined, and the exhaust pipe injection amount is proportional integral derivative (PID) controlled based on this difference so as to obtain the target regeneration temperature.

PRIOR ART DOCUMENTS

Patent Document 1: Japanese Patent Application Publication No. 2000-303826

Patent Document 2: Japanese Patent No. 4175281

In the idle automatic regeneration performed when the vehicle is stopped, automatic regeneration can be performed by exhaust pipe injection, while maintaining the exhaust gas temperature in the DPD, even during idling in which the rotation speed is low and the amount of exhaust gas is small, by dropping the rotation speed to the regeneration idle rotation speed and closing the exhaust brake valve.

However, even when the exhaust pipe injection is performed by closing the exhaust brake valve as mentioned hereinabove, since the amount of exhaust gas flowing in the DOC is small, the regeneration temperature often does not reach the target regeneration temperature and unburned fuel that has been injected into the exhaust pipe remains accumulated in the DOC.

The PID control is typically performed to ensure convergence to a set value by combining a proportional control term (P term), an integral control term (I term), and a derivative control term (D term). In such control, in the proportional control term, the operation amount is changed proportionally to a difference, in the integral control term, the differences are added up and the operation amount is changed proportionally to the value obtained, thereby eliminating the residual difference (stationary difference) present in the proportional control, and in the derivative control term, the variation rate of the difference is converted into a speed, and the operation amount proportional thereto is outputted, thereby increasing the response rate and ensuring rapid convergence to the set value.

During idle automatic regeneration, the regeneration temperature does not reach the target temperature, as mentioned hereinabove. Therefore, where the exhaust pipe injection amount is controlled by the PID control, in the proportional control term, a constant operation amount is outputted based on the difference, and in the derivative control term, a constant operation amount is also outputted since the difference is absent. Therefore, in terms of control, no obstacles are created during the idle control even in a state in which the difference is not varied. However, in the integral control term, since the differences are added up within a predetermined integral time, where the idle control is extended, the operation amount of the integral control term increases and rises to the upper limit value. Further, because of a large difference in the exhaust gas amount between the traveling and idle states of the vehicle, an optimum integral control term should be taken for each state.

Where the exhaust brake valve is opened when the integral control term has thus risen to the upper limit value and a transition has been made from the idle automatic regeneration to the traveling automatic regeneration, a large amount of exhaust gas flows from the engine to the exhaust pipe, and where the exhaust pipe injection is performed at the same time based on the operation amount determined by the preceding PID control, a large amount of the unburned fuel and exhaust gas flows to the DPD, the unburned fuel accumulated in the DOC is burned, and the regeneration temperature greatly overshoots the target temperature. In this case, significant overshooting occurs when the idle automatic regeneration time is long, and when the idle stoppage time is short, the effect produced by the integral control term is apparently small.

SUMMARY OF THE INVENTION

Accordingly, it is an object of the present invention to resolve the above-described problem and provide an exhaust gas purification system in which control ranging from traveling automatic regeneration to idle automatic regeneration conducted during a stop can be accurately performed, and overshoot of the exhaust gas temperature can be prevented even when a transition is made from the idle automatic regeneration to the traveling automatic regeneration.

In order to attain the abovementioned object, the invention provides an exhaust gas purification system in which a DPD for collecting PM contained in exhaust gas is connected to an exhaust pipe of a diesel engine, and when an amount of PM in the DPD becomes equal to or greater than a predetermined amount, an exhaust gas temperature of the diesel engine is increased by performing exhaust pipe injection and the DPD is automatically regenerated, wherein an exhaust gas temperature during DPD regeneration in automatic regeneration is detected, a difference between the detected exhaust gas temperature and a target regeneration temperature is determined, and in a case where an exhaust pipe injection amount is PID controlled based on the difference, when a transition is made from traveling automatic regeneration to idle automatic regeneration conducted during a stop, an integral control term in the PID control is reset to zero to control the exhaust pipe injection amount.

When a transition to the traveling automatic regeneration is made within a predetermined time interval after the start of the idle automatic regeneration performed after the vehicle is stopped, the control of the exhaust pipe injection amount by the PID control can be continued after the integral control term is reset to zero in the idle automatic regeneration.

When a transition to the traveling automatic regeneration is made after a predetermined time elapses since the start of the idle automatic regeneration performed after the vehicle can be stopped, the integral control term in the PID control is again reset to zero.

When the vehicle is decelerated and stopped from the traveling automatic regeneration, the exhaust pipe injection performed by the PID control can be continued during the deceleration, and the integral control term in the PID control is reset to zero after the vehicle is stopped.

Further, an exhaust brake valve can be closed when the idle automatic regeneration is started, and the exhaust brake valve is opened when a transition is made to the traveling automatic regeneration.

The present invention demonstrates the following excellent effect. Thus, negative effects produced by the PID control during idle automatic regeneration are eliminated and overshooting of the exhaust gas temperature in the DPD can be prevented.

DETAILED DESCRIPTION

Preferred embodiments of the present invention will be described in detail hereinbelow with reference to the appended drawings.

Figure 1:
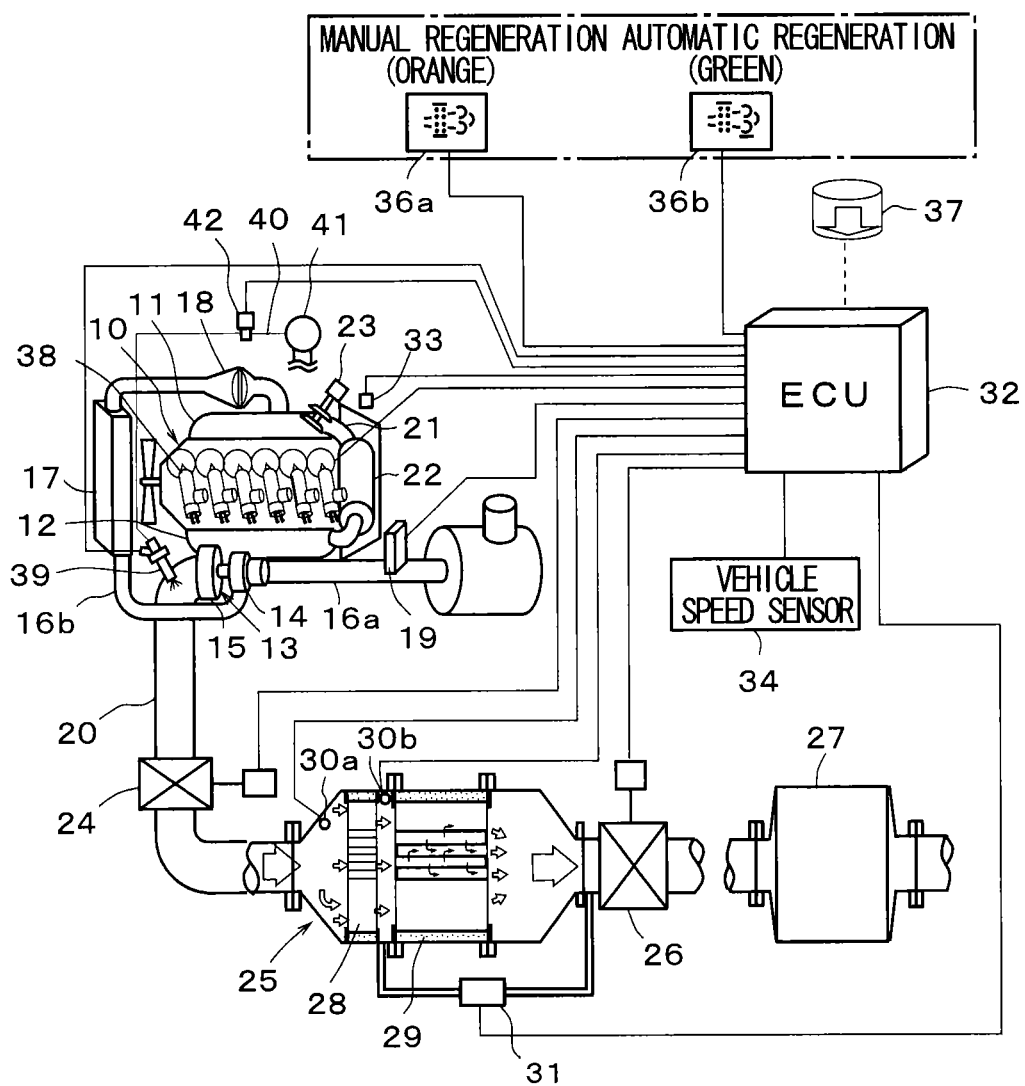
FIG. 1 shows the entire configuration of one embodiment of the present invention.

In FIG. 1, an intake manifold 11 and an exhaust manifold 12 of a diesel engine 10 are respectively connected to a compressor 14 and a turbine 15 of a supercharger 13, the air from an upstream intake pipe 16a is pressurized by the compressor 14, cooled when passing through an intercooler 17 of a downstream intake pipe 16b, and supplied from the intake manifold 11 via an intake throttle valve 18 into the diesel engine 10. The exhaust gas from the diesel engine 10 is discharged into an exhaust pipe 20 after driving the turbine 15.

A mass air flow sensor (MAF) 19 that measures the intake amount is provided in the upstream intake pipe 16a, and the degree of opening of the intake throttle valve 18 is controlled and the intake amount is adjusted by the mass air flow sensor (MAF). An EGR (Exhaust Gas Recirculation) pipe 21 for returning part of the exhaust gas into the intake system of the engine 10 and reducing the amount of NOx is connected to the exhaust manifold 12 and the intake manifold 11, and an EGR cooler 22 and an EGR valve 23 are connected to the EGR pipe 21.

An exhaust brake valve 24, a DPD 25, an exhaust throttle valve 26, and a silencer 27 are connected to the exhaust pipe 20. The DPD 25 is constituted by a DOC 28 constituted by an active catalyst that oxidizes the unburned fuel and a CSF 29 that collects PM contained in the exhaust gas.

An exhaust pipe injector 39 that injects fuel (exhaust pipe injection) into the exhaust pipe 20 with the object of increasing the exhaust gas temperature during DPD regeneration is provided upstream of the exhaust brake valve 24. A fuel filter 41 that removes foreign matter or moisture that is mixed with or generated in the fuel is connected to a fuel supply line 40 supplying fuel from a fuel tank (not shown in the figure) to the exhaust gas injector 39. A fuel pressure sensor 42 that measures the fuel pressure of the exhaust pipe injector 39 is provided downstream of the fuel filter.

A SCR device that denitrifies NOx with ammonia is connected between the exhaust throttle valve 26 and the silencer 27 (this configuration is not shown in the figure).

Exhaust gas temperature sensors 30a, 30b are provided before and after the DOC 28, respectively, a differential pressure sensor 31 is provided to detect a PM accumulation amount in the CSF 29, and the detection values thereof are inputted to an ECU (engine control unit) 32.

The detection value of a rotation speed sensor 33 detecting the rotation speed of the engine and the detection value of a vehicle speed sensor 34 are inputted to the ECU 32.

The ECU 32 controls the fuel injection amount in the fuel injector 38 according to the accelerator depression amount during traveling and also controls, as appropriate, the intake throttle valve 18, exhaust brake valve 24, and exhaust throttle valve 26.

In such an exhaust gas treatment system, when the ECU 32 determines that a predetermined amount of PM has accumulated in the DPD 25 based on the detection value of the differential pressure sensor 31 detecting the difference in pressure before and after the CSF 29, or when the travel distance after the previous regeneration reaches a predetermined value, regeneration is performed by finally raising the exhaust gas temperature to about 600° C. and burning the PM.

In the regeneration, multi-injection (pilot injection, pre-injection, main injection, and after-injection) is performed with the fuel injector 38 to obtain a temperature equal to or higher than the catalyst activation temperature in the DOC 28, and the PM is then burned by raising the exhaust gas temperature, for example, to 500° C. and then 600° C. by performing exhaust pipe injection of the fuel into the exhaust pipe 20 with the exhaust pipe injector 39. Automatic regeneration is usually performed during traveling, and in this period the ECU 32 lights up an automatic regeneration lamp 36b during the regeneration. In the automatic regeneration, where the traveling vehicle is repeatedly accelerated and decelerated, the exhaust gas temperature becomes unstable, a PM combustion residue appears in the DPD 25, and the regeneration interval is shortened. In this case, the manual regeneration lamp 36a is lit up, the driver is warned about manual regeneration, and the driver regenerates the DPD 25 by manual regeneration by pushing a manual regeneration execution switch 37 after the vehicle is stopped.

Figure 2:
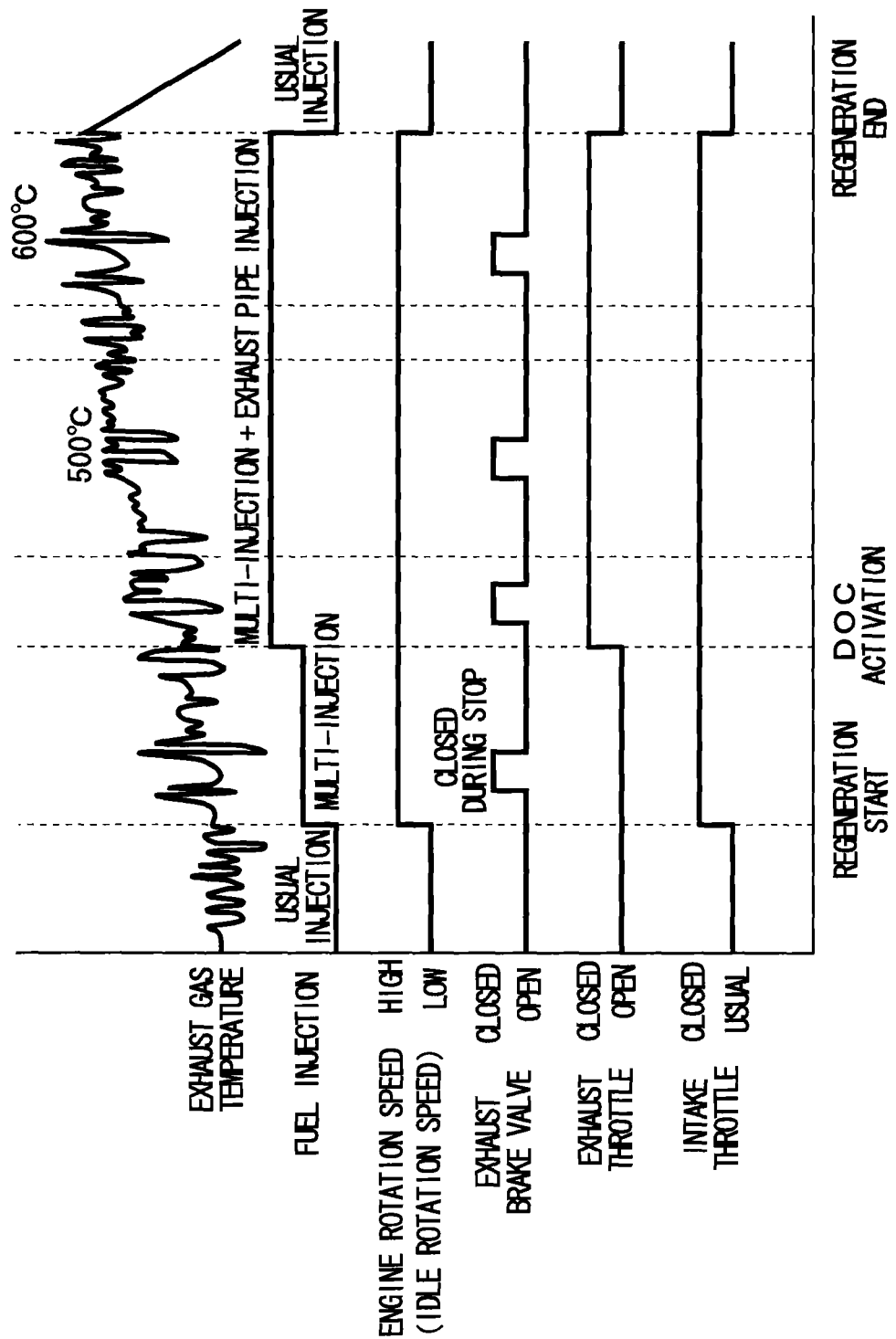
FIG. 2 is a control chart relating to automatic regeneration in the present invention.

The control chart of the ECU 32 during automatic regeneration is explained below with reference to FIG. 2.

In the course of automatic regeneration, the ECU 32 throttles the intake throttle valve 18, induces multi-injection to raise the exhaust gas temperature to a value equal to or higher than the catalyst activation temperature, and then adds the exhaust pipe injection performed by the exhaust pipe injector 39 to the multi-injection, thereby raising the temperature, for example, to 500° C. and then 600° C., burning the PM and regenerating the DPD 25. Since the regeneration involves the exhaust pipe injection, the EGR valve 23 is under usual control. After the regeneration is completed, the intake throttle valve 18 is returned to the usual control.

When the vehicle stops, e.g., at the traffic light, during the automatic regeneration, the engine rotation speed is increased from the usual idle rotation speed to the regeneration idle rotation speed when the transmission gear is in neutral, and when the gear is shifted, the regeneration idle rotation speed is set lower than the regeneration idle rotation speed in neutral to prevent the vehicle from moving abruptly from the stop. Further, during the automatic regeneration, the ECU 32 lights up the automatic regeneration warning lamp 36b.

When the DPD is regenerated by adding exhaust pipe injection to the multi-injection, the exhaust pipe injection amount is controlled, for example, in a manner such that the initial target regeneration temperature is set, for example, to 500° C., and where the PM in the DPD is burned to a certain degree, the target temperature is changed and the final target regeneration temperature is set, for example, to 600° C., in order to prevent the accumulated PM from burning instantaneously when the exhaust gas temperature is raised to 600° C.

The PID control of the exhaust pipe injection amount is explained below.

First, during the automatic regeneration, the exhaust gas temperature is detected by the exhaust gas temperature sensor 30b explained with reference to FIG. 1, and the ECU 32 determines the difference e between the target regeneration temperature and the exhaust gas temperature, and determines the operation amount M of exhaust pipe injection performed with the exhaust pipe injector 39 by the PID control based on the determined difference.

The operation amount M is represented by the following equation.

$$M = Kp \cdot e + Ki \cdot (1/Ti) \cdot \int e \, dt + Kd \cdot Td (de/dt)$$

In the equation above, Kp is a proportionality constant of proportional control, Ki is a proportionality constant of integral control, Kd is a proportionality constant of derivative control, Ti is an integral time, Td is a derivative time, and t is time.

Here, the operation amount M is determined by the sum total of the proportional control term, integral control term, and derivative control term. The actual exhaust pipe injection amount is determined by adding an operation amount of the base term to this operation amount M at a fuel pressure determined by the fuel pressure sensor 42 and in the valve opening period of the exhaust pipe injector 39.

In the PID control, during the traveling automatic regeneration, since the engine rotation speed is high, the exhaust gas temperature can be raised correspondingly to the exhaust pipe injection amount. Therefore, accurate control to the target regeneration temperature can be performed.

However, immediately before the vehicle is stopped at the traffic lights or due to traffic conditions, the engine rotation speed drops, the amount of exhaust gas also decreases, and the difference e increases. In this state, the vehicle stops, control is performed to prevent the temperature of the exhaust gas in the DPD 25 from decreasing by closing the exhaust brake valve 24 and the exhaust throttle valve 26 and increasing the exhaust pipe injection amount, and although the engine rotation speed increases from the usual idle rotation speed to the regeneration idle rotation speed when the gear is in neutral and also when the gear is shifted, since the regeneration idle rotation speed is lower than the engine rotation speed during traveling, both the amount of air taken into the engine and the amount of exhaust gas decrease, thereby making it difficult to maintain or increase the regeneration target temperature. As a result, the difference e further increases.

In this case, when the difference e is constant, the proportional control term and derivative control term are constant, but since the integral control term is obtained by integration of the increased e, in the idle regeneration, the exhaust pipe injection amount rises to the upper limit value. When the vehicle travels from the stop and a transition is made to the traveling automatic regeneration in this control state, the air intake amount increases with the increase in the engine rotation speed, the exhaust gas temperature rises rapidly, and the DPD 25 can melt.

Therefore, in accordance with the present invention, when the vehicle stops and idle automatic regeneration is started, the integral control term in the control equation of the PID control is reset to zero as the exhaust brake valve 24 is closed. Where the integral control term is thus reset to zero, the integration of the difference e caused by the traveling state of the vehicle immediately before the vehicle is stopped is eliminated, and stable idle automatic regeneration can be performed by conducting idle automatic regeneration by determining the exhaust pipe injection amount by the PID control based on the difference e in a stopped state of the vehicle.

Further, when the vehicle starts moving within a predetermined period (for example, within 3 min) from the stopped state as the idle automatic regeneration is being performed after such zero reset, the traveling automatic regeneration can be smoothly performed by controlling the exhaust pipe injection amount by the PID control after the zero reset. When the stoppage time exceeds the predetermined time (for example, 3 min), the operation amount determined by the integral control term increases. Therefore, the occurrence of exhaust gas temperature overshoot can be prevented by performing the traveling automatic regeneration after the integral control term is again reset to zero.

As described hereinabove, in accordance with the present invention, the integral control term of PID control is reset to zero when the exhaust pipe injection amount is PID controlled during the idle automatic regeneration, thereby ensuring stable idle automatic regeneration. Further, after such idle automatic regeneration, smooth switching from the idle automatic regeneration to the traveling automatic regeneration can be performed by determining whether to reset the integral control term again to zero or continue the control as is, that is, without resetting, according to the stoppage time of the vehicle.

The invention claimed is:

1. A vehicle exhaust gas purification system in which a diesel particulate defuser for collecting particulate matter contained in exhaust gas is connected to an exhaust pipe of a diesel engine, and when an amount of particulate matter in the diesel particulate defuser becomes equal to or greater than a predetermined amount, an exhaust gas temperature of the diesel engine is increased by performing exhaust pipe injection and the diesel particulate defuser undergoes automatic regeneration, comprising:
a sensor for detecting an exhaust gas temperature during the regeneration; and
an engine control device including a proportional integral derivative controller, which device is configured to receive the exhaust gas temperature detected by the sensor, to determine a difference between the detected exhaust gas temperature and a target regeneration temperature, to control an exhaust pipe injection amount using proportional integral derivative control based on the difference, and when a transition is made from traveling automatic regeneration to idle automatic regeneration during a stop of the vehicle, and to reset an integral control term in the proportional integral derivative control to zero to control the exhaust pipe injection amount.

2. The exhaust gas purification system according to claim 1, wherein when a transition to the traveling automatic regeneration is made within a predetermined time interval after a start of the idle automatic regeneration after the vehicle is stopped, the control of the exhaust pipe injection amount by the proportional integral derivative control is continued after the integral control term is reset to zero in the idle automatic regeneration.

3. The exhaust gas purification system according to claim 1, wherein when a transition to the traveling automatic regeneration is made after a predetermined time elapses since a start of the idle automatic regeneration after the vehicle is stopped, the integral control term in the proportional integral derivative control is again reset to zero.

4. The exhaust gas purification system according to claim 1, wherein when the vehicle is decelerated and stopped from the traveling automatic regeneration, the exhaust pipe injection performed by the proportional integral derivative control is continued during the deceleration, and the integral control term in the proportional integral derivative control is reset to zero after the vehicle is stopped.

5. The exhaust gas purification system according to claim 1, further comprising:
an exhaust brake valve which is closed when the idle automatic regeneration is started, and which is opened when a transition is made to the traveling automatic regeneration.

6. The exhaust gas purification system according to claim 2, further comprising:
an exhaust brake valve which is closed when the idle automatic regeneration is started, and which is opened when a transition is made to the traveling automatic regeneration.

7. The exhaust gas purification system according to claim 3, further comprising:
an exhaust brake valve which is closed when the idle automatic regeneration is started, and the exhaust brake valve which is opened when a transition is made to the traveling automatic regeneration.

* * * * *